Patented Sept. 7, 1926.

1,599,030

UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

FOOD PRODUCT.

No Drawing.  Application filed August 4, 1925. Serial No. 48,116.

This invention relates to new food products designed particularly for animal feeding and includes the new food products themselves as well as the method of producing the same.

The new food products are fermented food products made from blood admixed with a carbohydrate and to which a suitable culture of lactic acid bacteria has been added, the fermentation being allowed to proceed for a suitable time and the product being then dried.

It is well known that the blood of the common meat-producing animals is an extremely poor food and will not support life. It is also well known that it is difficult to supplement blood so as to make it a satisfactory food.

The new method of the present invention results in the production of a fermented food product made from blood and which is a valuable addition to the list of available animal foods.

In carrying out the process of the present invention and in making the new food products, blood is taken, together with suitable carbohydrate material, and there is added to it a suitable culture of lactic acid bacteria, and the fermentation is allowed to proceed for several days. The blood used is raw animal blood derived from cattle, sheep, hogs or other edible food animals. The carbohydrate or carbohydrate-containing substance may be material such as starch, glucose, cane sugar, or carbohydrate-containing material, e. g., bran or paunch contents. A wide latitude is permissible as to proportions and amounts of carbohydrate material. The amount of such material may, for example, be such that in the dry finished product it varies from about 10% to about 90%. The lactic acid bacteria may be the ordinary lactic acid bacteria, but a pure culture need not be used. The lactic acid culture may, for example, be such as is made with skimmed milk. The amount of lactic acid culture can be varied over a considerable range.

The invention will be further illustrated by the following specific example, but the invention is not limited thereto:

50-pounds of fresh beef blood, 20-pounds of starch, 25-pounds of bran, and 5-pounds of lactic acid culture made from skimmed milk are intimately admixed and the fermentation is allowed to proceed for several days. The fermentation may be allowed to go to its own natural limitation. With an increased amount of lactic acid culture, a more rapid action is obtained and an increased amount of the culture may be used if more rapid action is desired. After the fermentation has gone to substantial completion, i. e., until the increase in acidity stops the further fermentation, the product may then be dried and if desired ground to give a pulverulent product.

Depending upon the portions of blood and carbohydrate material and the extent of the lactic acid fermentation, the product will vary somewhat in its composition.

The lactic acid fermentation of the composition is a selective as well as a protective fermentation. It proceeds first at the expense of the carbohydrates, but it nevertheless protects the blood proteins, etc. from putrefaction. The lactic acid fermentation results in the production of lactic acid in the product, and, where the product is not heated to too high a temperature during drying this acid remains in the final product and imparts to it an acid character. By adding small quantities of calcium carbonate from time to time to neutralize part of the lactic acid formed, the fermentation may be made to take place to a somewhat further extent with the resulting production of a product containing both lactic acid and calcium lactate. It is desirable, however, to avoid excess calcium carbonate so as to maintain at all times enough lactic acid to exert a protective action and prevent putrefaction of blood constitutents.

The fermented product after drying and grinding to the desired degree of fineness is a composite food product containing the blood as modified by the fermentation and also containing the unfermented carbohydrate material together with the products of the lactic acid fermentation.

It will thus be seen that animal blood which is of low value as a food product is, by the process of the present invention, converted into an improved and valuable composite food product of a fermented character in which the blood, modified by the fermentation, is admixed with other ingredients in part added before the fermentation and in part produced by the fermentation.

I claim:

1. A new food product comprising the fermentation product of blood, carbohydrate material and lactic acid bacteria.

2. A new food product comprising the fermentation product of blood, carbohydrate material and lactic acid bacteria, said product being in a dried and ground state.

3. A new food product comprising the fermentation product of blood, starch and lactic acid bacteria.

4. The method of producing a food product which comprises subjecting a mixture of blood and carbohydrate material to fermentation with lactic acid bacteria.

5. The method of producing a food product which comprises subjecting a mixture of blood and carbohydrate material to fermentation with lactic acid bacteria, the fermentation being allowed to proceed to substantial completion and the product being then dried and ground.

6. The method of producing a food product which comprises adding a culture of lactic acid bacteria to a mixture of blood and carbohydrate material, allowing the fermentation to proceed a sufficient length of time and drying the resulting product.

In testimony whereof I affix my signature.

WILLIAM D. RICHARDSON.